(12) United States Patent
Agrawal et al.

(10) Patent No.: US 8,661,423 B2
(45) Date of Patent: Feb. 25, 2014

(54) AUTOMATED DETERMINATION OF QUASI-IDENTIFIERS USING PROGRAM ANALYSIS

(75) Inventors: Hiralal Agrawal, Bridgewater, NJ (US); Munir Cochinwala, Basking Ridge, NJ (US); Joseph R. Horgan, Somerville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 884 days.

(21) Appl. No.: 12/771,130

(22) Filed: Apr. 30, 2010

(65) Prior Publication Data

US 2011/0119661 A1     May 19, 2011

Related U.S. Application Data

(60) Provisional application No. 61/174,690, filed on May 1, 2009.

(51) Int. Cl.
*G06F 9/45* (2006.01)
*G06Q 40/00* (2012.01)
*G06F 17/30* (2006.01)

(52) U.S. Cl.
USPC ............... 717/154; 705/44; 705/74; 707/706; 707/757

(58) Field of Classification Search
None
See application file for complete search history.

(56) References Cited

U.S. PATENT DOCUMENTS

| | | | |
|---|---|---|---|
| 5,708,828 A | 1/1998 | Coleman | |
| 5,819,226 A * | 10/1998 | Gopinathan et al. | 705/44 |
| 5,862,382 A * | 1/1999 | Kataoka | 717/131 |
| 6,339,772 B1 | 1/2002 | Klein et al. | |
| 6,389,533 B1 | 5/2002 | Davis et al. | |
| 7,107,585 B2 * | 9/2006 | Berent et al. | 717/154 |
| 7,219,341 B2 * | 5/2007 | Dalton et al. | 717/154 |
| 7,269,578 B2 * | 9/2007 | Sweeney | 705/74 |
| 7,475,085 B2 * | 1/2009 | Aggarwal et al. | 1/1 |
| 7,698,690 B2 * | 4/2010 | Krauss | 717/127 |
| 7,721,275 B2 * | 5/2010 | Kestner et al. | 717/154 |
| 7,937,383 B2 * | 5/2011 | Hintze et al. | 707/706 |
| 8,112,422 B2 * | 2/2012 | Srivastava et al. | 707/737 |
| 2002/0169793 A1 * | 11/2002 | Sweeney | 707/204 |
| 2005/0044059 A1 | 2/2005 | Samar | |
| 2007/0169051 A1 * | 7/2007 | Krauss | 717/154 |

(Continued)

OTHER PUBLICATIONS

Latanya Sweeney, k Anonymity a Model for Protecting Privacy, 2001 MIT, 14 pages, <http://arbor.ee.ntu.edu.tw/archive/ppdm/Anonymity/SweeneyKA02.pdf>.*

(Continued)

*Primary Examiner* — Thuy Dao
*Assistant Examiner* — Cuong V Luu
(74) *Attorney, Agent, or Firm* — Philip J. Feig (57) ABSTRACT

A system and method for automated determination of quasi-identifiers for sensitive data fields in a dataset are provided. In one aspect, the system and method identifies quasi-identifier fields in the dataset based upon a static analysis of program statements in a computer program having access to—sensitive data fields in the dataset. In another aspect, the system and method identifies quasi-identifier fields based upon a dynamic analysis of program statements in a computer program having access to—sensitive data fields in the dataset. Once such quasi-identifiers have been identified, the data stored in such fields may be anonymized using techniques such as k-anonymity. As a result, the data in the anonymized quasi-identifiers fields cannot be used to infer a value stored in a sensitive data field in the dataset.

4 Claims, 6 Drawing Sheets

(56) References Cited

U.S. PATENT DOCUMENTS

| | | |
|---|---|---|
| 2007/0226631 A1 | 9/2007 | Tevis |
| 2007/0233711 A1* | 10/2007 | Aggarwal et al. ............. 707/100 |
| 2010/0034376 A1 | 2/2010 | Okuizumi et al. |
| 2010/0114920 A1* | 5/2010 | Srivastava et al. ............ 707/757 |

OTHER PUBLICATIONS

Charu C. Aggarwal, On k Anonymity and the Curse of Dimensionality, 2005 Trondheim, pp. 901-909, <http://dl.acm.org/citation.cfm?id=1083696>.*

Latanya Sweeney, Achieving k-Anonymity Privacy Protection Using Generalization and Suppression, 2002 Carnegie Mellon University, 18 pages, <https://utd.edu/~mxk055100/courses/privacy08f_files/kanon1.pdf>.*

Alina Campan et al., A Clustering Approach for Data and Structural Anonymity in Social Networks, 2008 PinKDD, 10 pages,<http://citeseerx.ist.psu.edu/viewdoc/download?doi=10.1.1.148.5896&rep=rep1&type=pdf>.*

Gagan Aggarwal et al., Achieving Anonymity via Clustering, 2006 ACM, pp. 153-162, <http://dl.acm.org/citation.cfm?id=1142374>.*

Brian Thompson et al., The Union-Split Algorithm and Cluster-Based Anonymization of Social Networks, 2009 ACM, pp. 218-227, <http://dl.acm.org/citation.cfm?id=1533057.1533088>.*

Patent Cooperation Treaty International Search Report, Jun. 19, 2010.

* cited by examiner

AUTOMATED DETERMINATION OF QUASI-IDENTIFIERS USING PROGRAM ANALYSIS

CROSS-REFERENCE TO RELATED APPLICATIONS

This application claims the benefit of the filing date of U.S. Provisional Patent Application No. 61/174,690, filed May 1, 2009, the disclosure of which is hereby incorporated herein by reference.

FIELD OF INVENTION

The present invention generally relates to a system and method for managing data, and more particularly to a system and method for identifying sensitive data so it can be anonymized in a manner that increases privacy.

BACKGROUND

Databases or datasets containing personal information, such as databases containing healthcare records or mobile subscribers' location records, are increasingly being used for secondary purposes, such as medical research, public policy analysis, and marketing studies. Such use makes it increasingly possible for third parties to identify individuals associated with the data and to learn personal, sensitive information about those individuals.

Undesirable invasion of an individual's privacy may occur even after the data has been anonymized, for example, by removing or masking explicit sensitive fields such as those that contain an individual's name, social security number, or other such explicit information that directly identifies a person.

One way this may occur is, for example, by analyzing less explicit and so called "quasi-identifier" fields in a dataset. In this regard, a set of quasi-identifier fields may be any subset of fields of a given dataset which can either be matched with other, external datasets to infer the identities of the individuals involved, or used to determine a value of another sensitive field in the dataset based upon the values contained in such fields.

For example, quasi-identifier fields may be data containing an individual's ZIP code, gender, or date of birth, which, while not explicit, may be matched with corresponding fields in external, publicly available datasets such as census data, birth-death records, and voter registration lists to explicitly identify an individual. Similarly, it may also be possible to infer values of otherwise hidden fields containing sensitive information such as, for example, disease diagnoses, if the values in such hidden, sensitive fields are dependent upon values of other quasi-identifier fields in the dataset, such as fields containing clinical symptoms and/or medications prescribed for example, from which information in an otherwise hidden field may be independently determined.

Typical systems and methods that seek to protect information contained in a dataset include several shortcomings. For example, many conventional methods depend upon a central tenet that all fields that qualify as either explicit or quasi-identifier fields can be easily identified in a dataset, which is not always the case. In addition, typical conventional techniques primarily focus on preventing identities of individuals to be revealed and do not adequately address the situation where values in other sensitive fields, such as an HIV diagnosis, may need to be hidden. Furthermore, conventional techniques that rely upon statistical analysis or machine learning approaches to determine quasi-identifiers in a dataset, while useful, are also prone to producing many false positives (fields are falsely identified as being quasi-identifiers when they are not) as well as many false negatives (fields are falsely identified as not being quasi-identifiers when they are).

Therefore, improved methods and systems are desired for identifying and anonymizing quasi-identifiers fields in a data set whose values may be used to infer the values in other sensitive fields.

SUMMARY OF THE INVENTION

In one aspect, a method for identifying quasi-identifier data fields in a dataset is provided. The method includes identifying a program having access to the dataset, the program including one or more program statements for reading or writing a value in one or more fields in the dataset; determining a first output program statement in the program, where the first program output statement is a program statement for writing a first value into a sensitive data field in the dataset; determining, with a processor, a first set of program statements in the program, where the first set of program statements includes one or more program statements that contribute to the computation of the first value written into the sensitive data field; and, analyzing, with the processor, the first set of program statements, and determining, based on the analysis of the first set of program statements, one or more quasi-identifier data fields associated with the sensitive data field in the dataset.

In another aspect, a system for identifying data fields in a dataset is provided, where the system includes a memory storing instructions and data, and a processor for executing the instructions and processing the data. The data includes a set of programs and a dataset having one or more data fields, and the instructions include identifying a program in the set of programs, the program having one or more program statements for reading or writing a value in one or more fields in the dataset; determining a first output program statement in the program, where the first program output statement is a program statement for writing a first value into a sensitive data field in the dataset; determining a first set of program statements in the program, where the first set of program statements includes one or more program statements that contribute to the computation of the first value written into the sensitive data field; and, analyzing the first set of program statements, and determining, based on the analysis of the first set of program statements, one or more data fields associated with the sensitive data field in the dataset.

DETAILED DESCRIPTION

A system and method for automated determination of quasi-identifiers fields for one or more sensitive fields in a given dataset are provided. Instead of identifying quasi-identifiers based on the conventional approach of analyzing the contents of a given dataset, the system and method disclosed herein identifies quasi-identifier fields based upon an analysis of computer programs that are used to create and manipulate the dataset. Once such quasi-identifier fields have been found, they may be anonymized using existing anonymization techniques such as k-anonymity or L-diversity. As a result, the anonymized quasi-identifiers cannot be used to identify an individual associated with the data in the dataset, or to infer a value of one or more other sensitive fields contained in the dataset.

Figure 1:
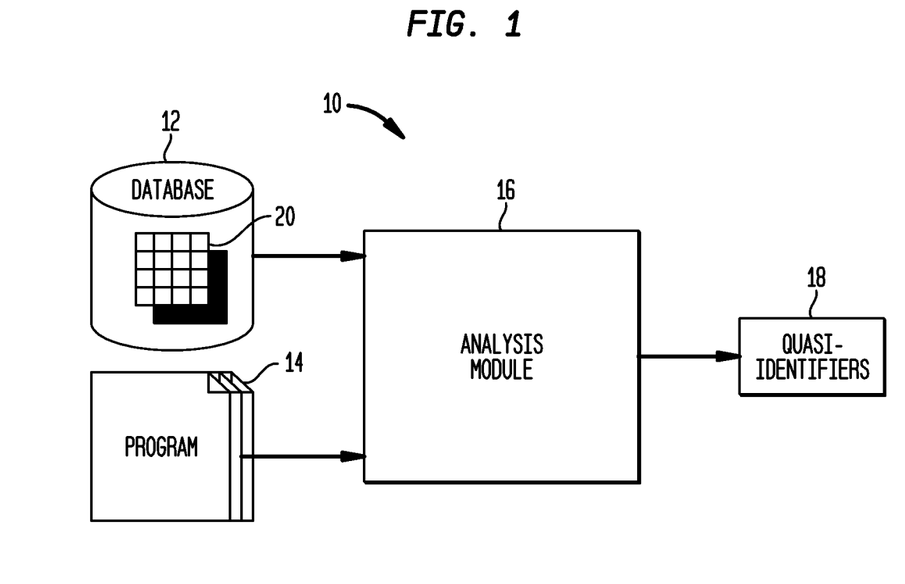
FIG. 1 illustrates a system in accordance with an aspect of the invention.

FIG. 1 illustrates a system 10 in accordance with various aspects of the invention disclosed herein. System 10 includes a database 12, one or more programs 14, an analysis module 16, and a list of quasi-identifier fields 18.

Database 12 may include one or more datasets 20, which may contain a set of data, including sensitive data that may need to be anonymized before the data set is provided to an external third party for further use, e.g., research or analysis. Dataset 20 may be organized by conventional columns and rows, where each column may be a field such as name, age, address, medical symptom, medical diagnosis, etc. Likewise, each row may be a record that includes related data in one or more fields that is associated with an individual. While the system and method disclosed herein is advantageous when the data set is organized by fields and records, it will be appreciated that the invention is not limited to any particular organization of data, and is equally applicable to any set of data that includes sensitive data that needs to be protected.

Program 14 may be one or more computer programs containing program statements that include instructions, executable by a processor, for reading, writing, storing, modifying, or otherwise manipulating the data contained in dataset 20. Program statements in program 14 may include program instructions written in any programming language, such as Java, C, C++, C#, Javascript, SQL, Visual Basic, Perl, PHP, pseudo-code, assembly, machine language or any combination of languages. Further, it will be understood that the system and invention disclosed herein is not limited to any particular type of program or programming language.

Analysis module 16 in system 10 may be implemented in hardware, software, or a combination of both. In one aspect, analysis module 16 may itself be a software program, executable by a processor, where the analysis module 16 has access to both program 14 and database 12 and contains instructions for analyzing program 14 for identifying quasi-identifier fields for one or more sensitive fields in dataset 20. Alternatively, the functionality of analysis module 16 may also be implemented in hardware, such as on a custom application specific integrated circuit ("ASIC").

Upon identification of the quasi-identifiers 18 based upon an analysis of program 14, analysis module may also contain instructions for anonymizing data in dataset 20 associated with such quasi-identifier fields using one or more anonymization techniques such as, for example, k-anonymity or other conventional anonymization techniques. Thus, quasi-identifiers 18 may be considered a list of quasi-identifiers fields determined by analysis module 16 to contain information based upon which values in other sensitive fields in dataset 20 may be ascertained.

Figure 2:
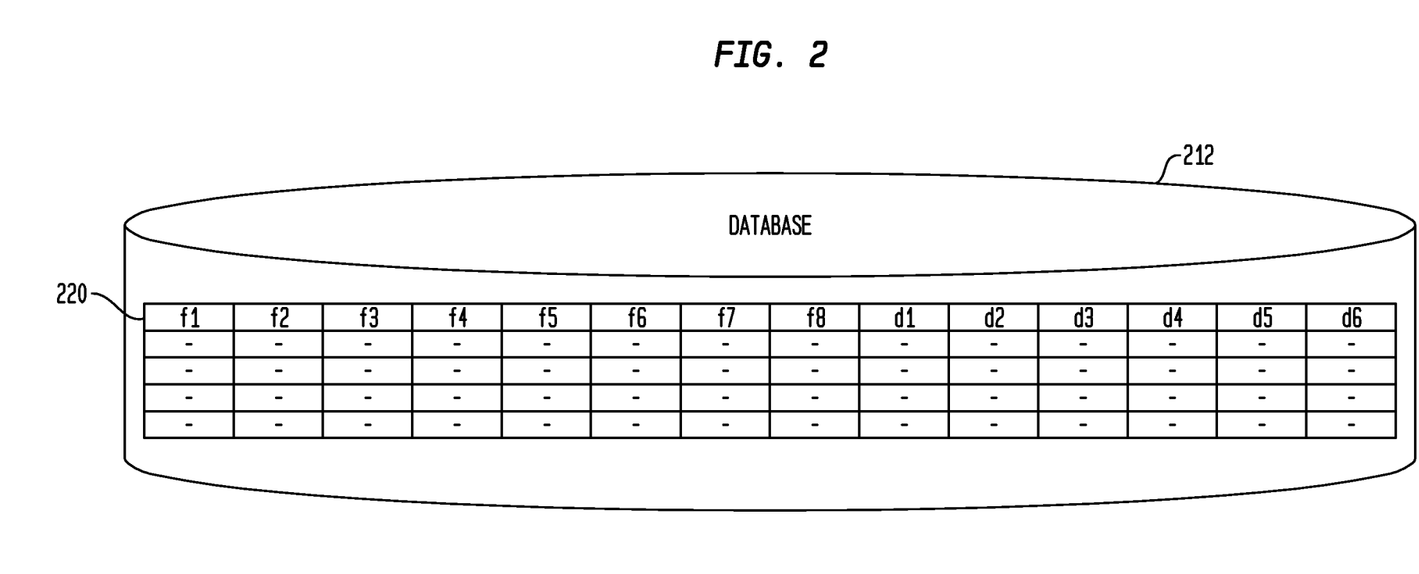
FIG. 2 illustrates a sample dataset in accordance with one aspect of the invention.

Operation of the system and method in accordance with one aspect is described below. FIG. 2 shows a database 212 containing a dataset 220 that includes data organized in a generic row and column format. In one embodiment, the data contained in dataset 220 may be a collection of medical records of patients treated in a hospital. In accordance with this embodiment, each row 222 in dataset 220 may contain a record of related medical data associated with a particular patient, including, for example, one or more medical symptoms (factors) and medical diagnoses, where the medical diagnoses are determined based on the patient's medical symptoms associated with the patient.

Each medical symptom or medical factor used to determine a diagnosis may be represented by a different field in the dataset. For example, each of the fields f1, f2, f3, f4, f5, f6, f7 and f8 may respectively represent factors such as takes_heart_medicine, has_chest_pain, has_diabetes, exercises_regularly, has_trouble_breathing, has_high_fat_diet, has_high_cholesterol, takes_tranquilizers, etc. Thus, each symptom field may contain a Boolean, true or false value (not shown), that indicates whether the particular medical factor represented by the field applies to the patient.

Likewise, each medical diagnosis may also be represented by a different field in the dataset. For example, fields d1, d2, d3, d4, d5 and d6 may also contain Boolean, true or false data (not shown), where each field respectively represents whether the patient has been diagnosed with a medical diagnosis such as has_heart_disease, has_heart_burn, has_heart_murmur, has_COPD, needs_surgery, etc. based on the one or more factors associated with the patient.

While particular types of fields containing Boolean or true or false data have been described for simplicity and ease of understanding, it will be understood that the system and method disclosed herein is not limited to any type of field or data, and is equally applicable to alpha-numeric data, image data, sound data, audio/visual data, documents, or any other compressed or uncompressed data that may be accessed and processed by a computer.

The values contained in one or more diagnoses fields d1-d6 in dataset 220 may be considered sensitive fields that need to be masked or anonymized for protecting the privacy of a patient before providing other data in dataset 220 to an external third party for marketing, research, or other purposes. For example, dataset 220 may contain many other fields (not shown) such as the patient's name, address, date of birth, social security information, insurance information, etc., which may need to be provided to an insurance company to determine how subscribers of its plans are using the provisions provided by the company. In such cases, instead of hiding or protecting information related to an individual's identity, it may be desirable to instead protect specific medical conditions or diagnoses associated with the patient. In addition to masking or anonymizing the values in explicitly sensitive fields (such as a patient's diagnoses), it is also desirable to be able to identify and anonymize the values in other, quasi-identifier fields, which may otherwise be used by a knowledgeable third party to infer the values contained in the sensitive fields. Thus, in one aspect, the analysis module may identify a list of quasi-identifier fields associated with the sensitive fields d1-d6 by analyzing one or more programs that are used to create or modify the data contained in dataset 220.

In computer programs, program slicing can be used to automatically identify parts of a program that affect the value of a given variable at a given point in that program. A computer program may compute many values during its execution. Program slicing can be used to determine the specific program statements that contribute towards the computation of specific values in that program. In one aspect, the analysis module may analyze one or more program slices in a program to automatically determine quasi-identifier fields for one or more sensitive fields in a dataset.

When a dataset is manipulated by a program, its fields may be considered as input or output fields (or both) from the perspective of that program. For each output field that is believed to contain sensitive data (i.e., a sensitive field), the analysis module may determine the corresponding program slice (a set of program statements), which yield all statements that directly or indirectly contribute towards computation of its value. The analysis module may then identify or extract quasi-identifiers associated with that output field from the program slice. If the output field is deemed to be a sensitive field for privacy reasons, then not only should the data in that field be masked, but one or more of the identified quasi-identifier fields may also be masked or anonymized. Otherwise, there is a risk that the value of the data in the sensitive field may be inferred based on the values of the quasi-identifier fields.

There are two aspects to computing and analyzing a program slice, referred to here as static analysis and dynamic analysis, by which the analysis module 16 may automatically determine a set of quasi-identifiers for a sensitive data field in a given dataset. The operation of the analysis module in accordance with each aspect is explained below with reference to an exemplary pseudo-code program having access to dataset 220.

Figure 3:
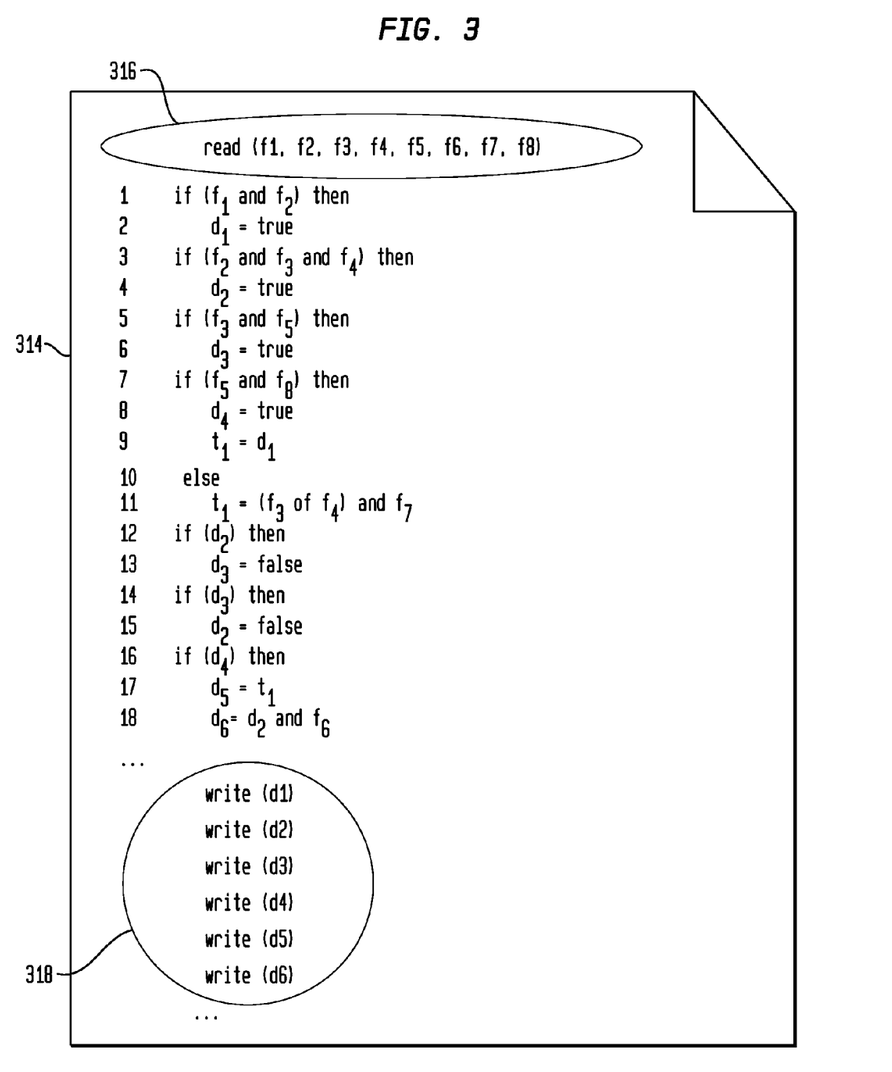
FIG. 3 illustrates an example of a pseudo-code program in accordance with one aspect of the invention.

FIG. 3 shows exemplary pseudo-code logic of a program 314 having access to dataset 220 that may be analyzed by the analysis module 16 using either static or dynamic program analysis. As seen therein, program 314 may contain instructions that may access dataset 220 and read, write, or modify the contents of the dataset. In one embodiment, program 314 may be an executable program slice of a larger medical program used by medical personnel to diagnose a patient with one or medical diagnoses (d1, d2, d3, d4, d5, d6) based on one or more medical factors (f1, f2, f3, f4, f5, f6, f7 and f8) contained in a patient's record in the dataset 220.

While line numbers 1-18 have been depicted to indicate certain program statements for ease of understanding, they are not necessary to the operation of the program. As indicated by reference numeral 316, program 314 may include one or more program statements for reading the values of one or more medical symptoms f1-f8 contained in a patient's record in the dataset. In addition, program 314 may also include program output statements (indicated by reference numeral 318) for writing one or more medical diagnoses d1-d6 into a patient's record in the dataset. Program 314 may execute according to the program statements in lines 1-18 to determine whether the value of one or more diagnoses d1-d6 is true or false based upon particular factors f1-f8 exhibited by the patient.

Figure 4:
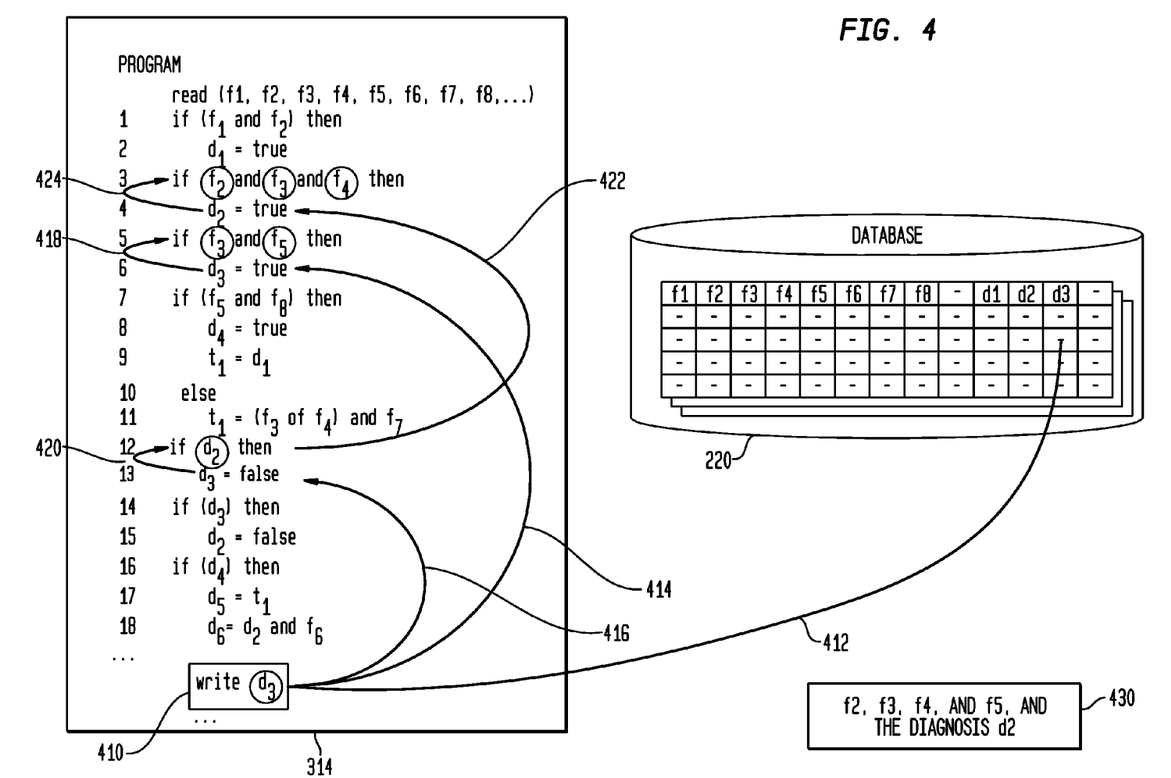
FIG. 4 illustrates an example of the operation of the system in FIG. 1 in accordance with an aspect of the system and method.

FIG. 4 illustrates an example of the analysis module 16 using static analysis for determining one or more quasi-identifier fields associated with the sensitive diagnosis field d3.

The analysis module may begin by analyzing the logic contained in the program statements in program 314, and identifying a program output statement (indicated by block 410) that writes a value into the sensitive data field d3 in dataset 220 (indicated by arrow 412).

The analysis module may then recursively determine and analyze a set of program statements (or program slice), that indirectly or directly contribute to computing the value that is written into the sensitive data field d3.

Thus, the analysis module may first identify the program statements in program 314 that may have last assigned a value (directly contributed) to the value of d3 which was written into the dataset 220. As indicated by the arrows 414 and 416, the analysis module may determine, based upon an examination of the logic in the program, that program statements on both line 6 and line 13 assign values to d3, and that either statement may thus have assigned a value that was ultimately written into the sensitive data field d3 in the dataset 220.

Having identified that the write statement in block 410 may be dependent on the program statements in lines 6 and 13, the analysis module may now recursively continue to analyze program 314 to determine any further program statements upon which the program statements in lines 6 and 13 may further depend, which may indirectly contribute to the value assigned to d3.

As the program statement on line 6 is executed only if the condition on line 5 is true (arrow 418), the analysis module may analyze the condition on line 5 and determine that that the program statement on line 6 depends upon the values of factors f3 and f5. Upon determining that the value in sensitive field d3 may depend on factors f3 and f5 (circled), the analysis module may recursively look for other statements that assign a value to these factors which may lead to yet further dependencies. As seen in FIG. 4, however, factors f3 and f5 are not assigned any values and do not have any dependencies on any other fields in the dataset 220. Thus, the analysis module may stop recursively looking for further dependencies for factors f3 and f5 and identify both as possible quasi-identifier fields for the sensitive data field d3.

Applying a similar analysis to the program statement on line 13, the analysis module may determine that the program statement on line 13 depends on the condition on line 12 (arrow 420). The analysis module may thus analyze the program statement on line 12 and also identify diagnosis d2 (circled) as a possible quasi-identifier field upon which the value assigned to sensitive field d3 may depend (a diagnosis field may be a quasi-identifier for another diagnosis field).

Upon determining that diagnosis field d3 may be dependent on diagnosis field d2 in dataset 220, the analysis module may continue to recursively analyze the program to determine any further dependencies of d2 (which may indirectly contribute to the value written into sensitive data field d3) by analyzing the program for one or more statements that may have last assigned a value to d2, which, as shown by arrow 422, is the program statement on line 4.

The assignment on program statement in line 4 is dependent on the conditional statement in line 3 (arrow 424). Thus, the analysis module may examine the statement in line 3 and determine that the value of d2 may be dependent on the value of factors f2, f3, and f4 (circled). Continuing to examine the program statements associated with factors f2, f3, and f4 recursively as described above, the analysis module may determine that these factors do not have any other dependencies, and thus conclude that all backward dependencies (all potential quasi-identifiers) for sensitive data field d3 have now been found. As factors f3 and f5 were already identified as quasi-identifiers previously, the analysis module may thus simply identify factors f2 and f4 as additional quasi-identifiers for the data field d3.

As indicated previously, the analysis module may now collect all quasi-identifier fields identified above into a quasi-identifier list 430 for sensitive data field d3, which, in this case, include factors f2, f3, f4, and f5 and the diagnosis d2, and anonymize or mask the quasi-identifier fields in the dataset using one or more conventional anonymization techniques.

The recursive program analysis method disclosed above for identifying the quasi-identifier fields for sensitive field d3 in program 314 be similarly applied to other sensitive fields in the dataset 220.

For example, applying the same static program analysis technique to diagnosis field d2 in program 314 reveals that it reciprocally depends on diagnosis d3 and the values of the same four factors, f2, f3, f4, and f5. Thus, if fields d2 and d3 represent heart disease and heart burn, respectively, and f2, f3, f4, and f5 represent factors related to blood pressure, chest pain, exercise level, and type of diet, respectively, then, according to the above program, these two diagnoses not only depend on the same set of symptoms and risk factors but they also depend on each other. Thus, if either d2 or d3 is considered a sensitive field for privacy reasons, then it is desirable to anonymize the other as well. Otherwise, there is a risk that the hidden diagnosis in one of these fields may be inferred based on the value of the diagnosis in the other field.

To provide yet another example, applying the same static program analysis technique to diagnosis field d2 in program 314 reveals that that program statement on line 8 is the last statement that assigns a value to variable d4. In addition, the program statement on line 8 is based upon the condition in the program statement on line 7, which, as seen, is based upon factors f5 and f8. As neither of these factors has any further dependencies (is not modified by the program 314), the analysis module may stop its backward trace for further dependencies and determine that factors f5 and f8 are the only possible quasi-identifier fields for diagnosis field d4.

As illustrated by the foregoing examples, statically analyzing a program slice (set of program statements) is often helpful in identifying quasi-identifiers for one or more sensitive data fields in a data set. However, static analysis of a program may sometimes also yield false positives (i.e., identify one or more fields as quasi-identifiers when they are not).

For example, this can be seen in program 314 with respect to diagnosis field d5. In this case, if static program analysis is applied in the manner described above to diagnosis field d5, the result indicates that sensitive field d5 may depend on all eight factors, f1 through f8. However, if instead of just statically identifying all potential dependencies as quasi-identifiers in the manner described above, the feasibility of paths during the operation (e.g., actual execution) of program 314 are also considered, it can be determined that, in fact, that there are only five factors that may be quasi-identifier fields for sensitive field d5, as described below.

As seen in program 314, the only place where d5 is assigned a value is on the program statement on line 17. However, line 17 can execute only if the program statement on line 16 evaluates to true, i.e., if d4 has the value true. But, d4 can be true only if line 8 executes. However, if line 8 executes, line 11 cannot execute, as lines 8 and 11 belong to the two opposing branches of the same conditional statement on line 7. Therefore, as line 8 must execute if d5 is assigned a value, and line 11 cannot execute (i.e., is infeasible) if line 8 executes, the factors f3, f4, and f7 evaluated in line 11 are not valid quasi-identifiers for field d5. Thus, field d5 only has five valid quasi-identifiers, which include f1, f2, f5, f6, and f8.

Based on the foregoing, it can be seen that diagnosis field d5 has only five valid quasi-identifiers, and not eight as indicated by static analysis. Such false positives may also arise if a program in question makes heavy use of indirect references via memory addresses. False positives like these, however, may be avoided if the analysis module also uses dynamic analysis, which is described next.

The static program analysis technique described in the previous sections included traversing all program paths (whether feasible or infeasible) when looking for statements that may have assigned or used a value in a given field. Instead, the analysis module may dynamically analyze a program to determine program paths, that are actually taken (and/or not taken) during execution of the program under different or all possible input conditions, to identify paths that are feasible and/or unfeasible. While, as demonstrated above, a program such as program 314 may contain infeasible paths, such paths will not be executed, and hence, no quasi-identifiers based on an analysis of an infeasible path would be considered by the analysis module during dynamic analysis.

In one embodiment, the analysis module may dynamically analyze the program statements in program 314 by tracing or observing all paths taken by program 314 during its execution by a processor in determining one or more diagnoses for a record of a particular patient. As program 314 executes, the analysis module may trace or record the actual path(s) traversed based on the inputs provided to the program. As a result, the analysis module, when determining a program statement where a given field was assigned a value, may recursively analyze paths (program statements) that were actually taken during the execution of the program when identifying quasi-identifiers with respect to a given sensitive data field, and ignore paths (program statements) that were not taken by the program.

Furthermore, this holds true even if a program makes heavy use of indirect assignments or references via memory addresses, because when the execution path used to compute dynamic slices (a set of program statements that are executed in a path taken by the program) is recorded, the actual memory addresses of variables that are assigned values and are used in all statements along that path can also be recorded by the analysis module, such that the analysis module may decide whether a particular program statement assigning or using a value via a memory address refers to a potential quasi-identifier field or not.

Thus, in one aspect, the analysis module may trace program paths that are executed by program 314 based one or more possible combinations of inputs. As one of ordinary skill in the art would appreciate, programs will often operate upon a finite combination of inputs. For example, analysis module may trace the execution of program 314 to dynamically identify quasi-identifier fields for the sensitive data field d5, based on true or false combinations of the finite factors f1-f8 and data fields d1-d4, and d6. While such "brute force" approach may be computationally burdensome, it will eliminate any chance of generating false positives. In another aspect, the analysis module may consider additional information that may be used to determine only valid inputs. For example, the analysis module may be programmed with information regarding specific symptoms and diagnoses, such that it can generate and analyze the program based on valid combinations of certain symptoms and/or diagnosis, while ignoring other invalid ones.

As most programs are normally tested to ensure that they function (execute) as desired with respect to a program's features, in another aspect, the same test data sets (input conditions) that are used to validate the program during testing may also be used to dynamically analyze the corresponding program slices and identify quasi-identifier fields for one or more sensitive fields in a database.

In this regard, the dataset that contains the sensitive fields and the quasi-identifier fields in question may, before masking or anonymization of such fields, itself serve as a test set of data.

Thus, dynamic analysis of a given program in the manner described above may dramatically reduce or even eliminate false positives in many cases.

There is a tradeoff involved between using static and dynamic analysis. While computing and analyzing a static slice may be much more efficient (e.g., faster), it may lead to false positives. Dynamic analysis, on the contrary, may be much more expensive, both in terms of computation time and space required, and it may miss detection of some genuine dependencies (i.e., may allow false negatives if feasible paths of a program under certain input conditions are not evaluated), but it substantially reduces or eliminates false positives.

Thus, in a yet another embodiment, the analysis module may also adaptively determine whether static analysis or dynamic analysis is more appropriate for a given program. A determination that dynamic analysis is more appropriate for a particular program may be adaptively made, for example, if the program contains many indirect variable references, such that static analysis of such a program is likely to contain many infeasible paths and result in many false positives. Thus, in one aspect the analysis module may compare the number of indirect references in all or a portion of the program to a threshold and determine a likelihood of generating an unacceptable number of false positives. If the number of indirect references exceeds the threshold or the likelihood of generating false positives is unacceptably high, then the analysis module may analyze the program using dynamic analysis. In other cases, the analysis module may adaptively determine that the number of indirect references or the likelihood of generating false positives is low (based on a comparison with a threshold), and analyze the program using static analysis based upon the determination it is likely to result in a few or acceptable number of false positives.

Figure 5:
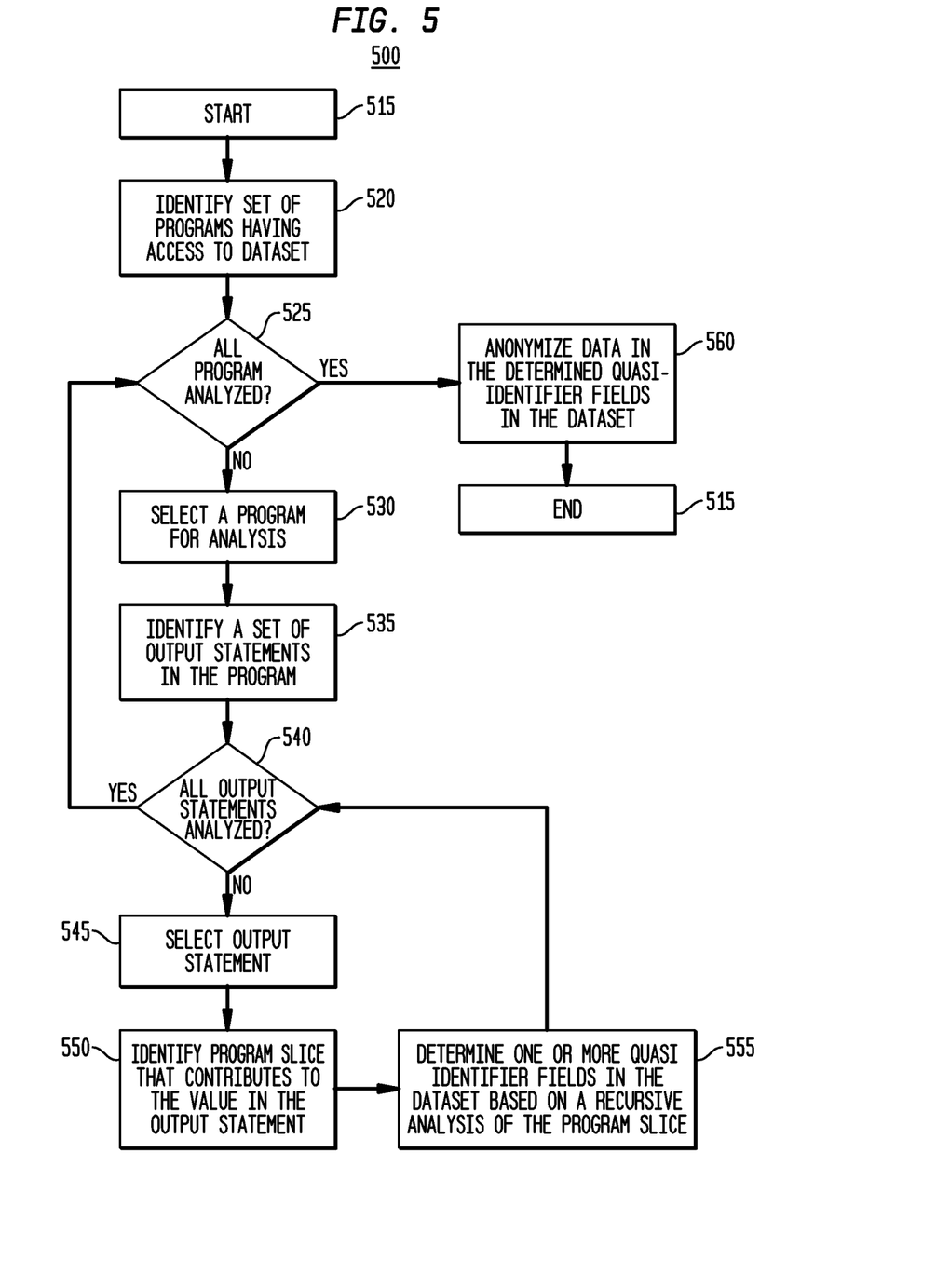
FIG. 5 illustrates a flow diagram in accordance with various aspects of the invention.

FIG. 5 is a flow chart of a process 500 in accordance with various aspects of the system and method disclosed herein. The process begins in block 515. In block 520, the system and method identifies a set of programs containing one or more programs having access to a given dataset, where each program in the set of programs include one or more program statements for reading, writing, modifying, or otherwise manipulating the data in the dataset.

In block 525, the system and method determines whether all programs in the set of programs identified in block 520 have been analyzed to determine one or more quasi-identifiers fields for one or more sensitive data fields contained in the dataset.

If the result of the check in block 525 is false, that is, that all of the programs in the set of programs have not been analyzed, then in block 530 the system and method selects a program from the set of programs for analysis.

In block 535, the system and method identifies a set of output statements in the program selected in block 530, where the set of output statements includes one or more output statements that write or update a value in one or more sensitive data fields in the dataset.

In block 540, the system and method determines if all output statements in the set of output statements identified in block 535 have been analyzed.

If the result of the check in block 540 is false, that is, all program statements in the set of output statements have not been analyzed, then in block 545 the system and method selects an output statement that remains to be analyzed from the set of output statements, where the output statement writes or updates a value of a given sensitive data field in the dataset.

In block 550, the system and method recursively identifies, using, for example, static and/or dynamic analysis, a set of one or more program statements (e.g., a program slice) that indirectly or directly contribute to the value that is written by the output statement into the given sensitive data field in the dataset.

In block 555, the system and method identifies one or more data fields in the dataset, which are indirectly or directly referenced in the set of program statements identified in block 550, as quasi-identifier fields for the given sensitive data field.

The system and method then returns to block 540 to check if all output statements in the selected program have been analyzed.

If the result of the check in block 540 is true, that is, all statements in the set of output statements for the selected program have been analyzed, the system and method returns to block 525 to check if all programs in the set of one or more programs have been analyzed.

If the result of the check in block 525 is true, i.e., each program in the set of one or more programs has been analyzed, then the system and method proceeds to block 560.

In block 560, the system and method uses conventional anonymization techniques such as K-anonymity or L-diversity to partially or completely mask the values of one or more fields in the dataset that have been determined to be quasi-identifier fields for one or more sensitive data fields. The system and method then ends in block 565.

Figure 6:
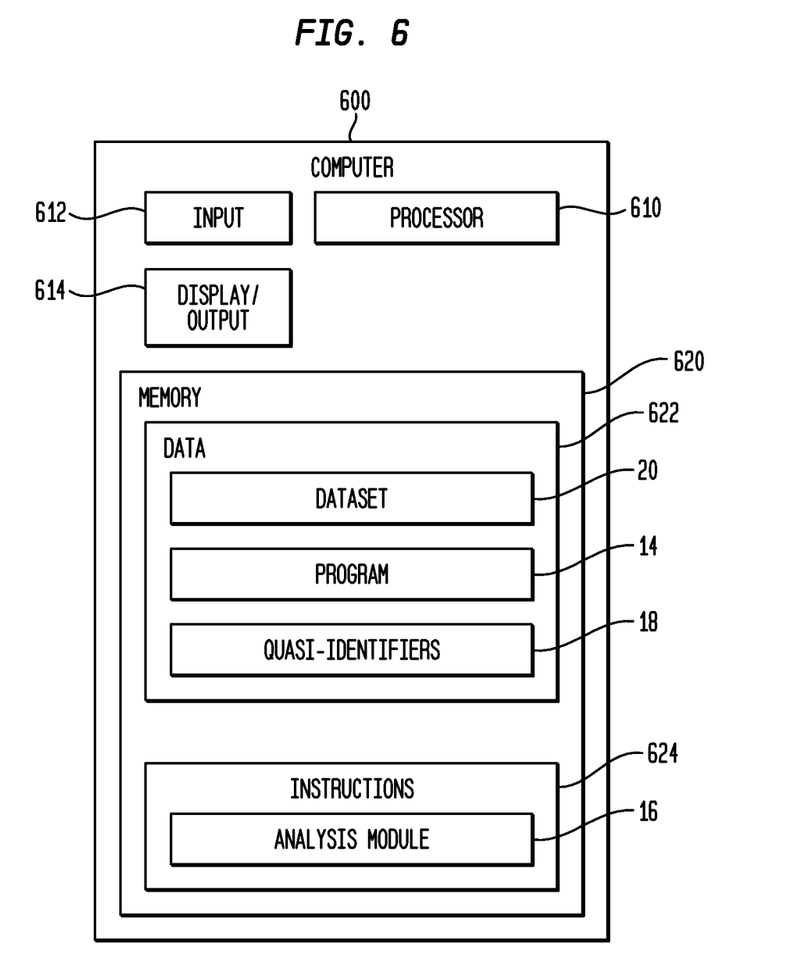
FIG. 6 illustrates a block diagram of a computing system in accordance with various aspects of the invention.

FIG. 6 is a block diagram illustrating a computer system upon which various aspects of the system and method as disclosed herein can be implemented. FIG. 6 shows a computing device 600 having one or more input devices 612, such as a keyboard, mouse, and/or various other types of input devices such as pen-inputs, joysticks, buttons, touch screens, etc. Computing device 600 also contains a display 614, which could include, for instance, a CRT, LCD, plasma screen monitor, TV, projector, etc. In one embodiment, the computing device 600 may be a personal computer, server or mainframe, mobile phone, PDA, laptop etc. In addition, computing device 600 also contains a processor 610, memory 620, and other components typically present in a computer.

Memory 620 stores information accessible by processor 610, including instructions 624 that may be executed by the processor 610 and data 622 that may be retrieved, executed, manipulated or stored by the processor. The memory may be of any type capable of storing information accessible by the processor, such as a hard-drive, ROM, RAM, CD-ROM, DVD, Blu-Ray disk, flash memories, write-capable or read-only memories. The processor 610 may comprise any number of well known processors, such as processors from Intel Corporation. Alternatively, the processor may be a dedicated controller for executing operations, such as an ASIC.

Data 622 may include dataset 20, program 14, and quasi-identifiers 18 as described above with respect to FIGS. 1-3. Data 622 may be retrieved, stored, modified, or processed by processor 610 in accordance with the instructions 624. The data may be stored as a collection of data. For instance, although the invention is not limited by any particular data structure, the data may be stored in computer registers, in a relational database as a table having a plurality of different fields and records, XML documents, or flat files. Data may also be stored in one or more relational databases.

Additionally, the data may also be formatted in any computer readable format such as, but not limited to, binary values, ASCII etc. Moreover, the data may include any information sufficient to identify the relevant information, such as descriptive text, proprietary codes, pointers, references to data stored in other memories (including other network locations) or information which is used by a function to calculate the relevant data.

Instructions 624 may implement the functionality described with respect to the analysis module and in accordance with the process disclosed above. The instructions 624 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. In one embodiment, instructions 624 may include analysis module 16, and the processor may execute instructions contained in analysis module 16 in accordance with the functionality described above.

Although the processor 610 and memory 620 are functionally illustrated in FIG. 6 as being within the same block, it will be understood that the processor and memory may actually comprise multiple processors and memories that may or may not be stored within the same physical housing or location. Some or all of the instructions and data, such as the dataset 20 or the program 14, for example, may be stored on a removable recording medium such as a CD-ROM, DVD or Blu-Ray disk. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 620 such as hard drives, data centers, server farms or the like.

In one aspect, computing device 600 may communicate with one or more other computing devices (not shown). Each of such other computing devices may be configured with a processor, memory and instructions, as well as one or more user input devices and displays. Each computing device may be a general purpose computer, intended for use by a person, having all the components normally found in a personal computer such as a central processing unit ("CPU"), display, CD-ROM, DVD or Blu-Ray drive, hard-drive, mouse, keyboard, touch-sensitive screen, speakers, microphone, modem and/or router (telephone, cable or otherwise) and all of the components used for connecting these elements to one another. In one aspect, for example, the one or more other computing devices may include a third party computer (not shown) to which the computing device 600 transmits a dataset for further use or analysis, where the dataset that the computing device 600 transmits to the third party computer may be a dataset that has been anonymized in accordance with various aspects of the system and method disclosed herein herein.

In addition, computing device 600 may be capable of direct and indirect communication with such other computing devices over a network (not shown). It should be appreciated that a typical networking system can include a large number of connected devices, with different devices being at different nodes of the network. The network including any intervening nodes, may comprise various configurations and protocols including the Internet, intranets, virtual private networks, wide area networks, local networks, private networks using communication protocols proprietary to one or more companies, Ethernet, WiFi, Bluetooth and HTTP. Communication across the network, including any intervening nodes, may be facilitated by any device capable of transmitting data to and from other computers, such as modems (e.g., dial-up or cable), network interfaces and wireless interfaces.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for automatically identifying one or more quasi-identifier data fields in a dataset, the method comprising:

identifying a program having access to the dataset, the program including one or more program statements for reading or writing a value in one or more fields in the dataset;

determining a first output program statement in the program, where the first program output statement is a program statement for writing a first value into a sensitive data field in the dataset;

determining, with a processor, a first set of program statements in the program, where the first set of program statements includes one or more program statements that contribute to the computation of the first value written into the sensitive data field;

wherein determining the first set of program statements further comprises:

comparing a number of indirect references in the program with a threshold number, and adaptively determining the first set of program statements using dynamic program analysis if the number of indirect reference is equal to or greater than the threshold;

adaptively determining the first set of program statements using static program analysis if the number of indirect references is less than the threshold; and, analyzing, with the processor, the first set of program statements, and determining, based on the analysis of the first set of program statements, one or more quasi-identifier data fields associated with the sensitive data field in the dataset.

2. A method for automatically identifying one or more quasi-identifier data fields in a dataset, the method comprising:

identifying a program having access to the dataset, the program including one or more program statements for reading or writing a value in one or more fields in the dataset;

determining a first output program statement in the program, where the first program output statement is a program statement for writing a first value into a sensitive data field in the dataset;

determining, with a processor, a first set of program statements in the program, where the first set of program statements includes one or more program statements that contribute to the computation of the first value written into the sensitive data field;

wherein determining the first set of program statements further comprises:

determining, with the processor, a likelihood of generating one or more false positives;

adaptively determining the first set of program statements using dynamic analysis if the likelihood of generating one or more false positives is equal to or greater than a threshold;

adaptively determining the first set of program statements using static analysis if the likelihood of generating one or more false positives is less than the threshold; and, analyzing, with the processor, the first set of program statements, and determining, based on the analysis of the first set of program statements, one or more quasi-identifier data fields associated with the sensitive data field in the dataset.

3. A system for automatically identifying one or more data fields in a dataset, the system comprising:

a memory storing instructions and data, the data comprising a set of programs and a dataset having one or more data fields;

a processor to execute the instructions and to process the data, wherein the instructions comprise:

identifying a program in the set of programs, the program having one or more program statements for reading or writing a value in one or more fields in the dataset;

determining a first output program statement in the program, where the first program output statement is a program statement for writing a first value into a sensitive data field in the dataset;

determining a first set of program statements in the program, where the first set of program statements includes one or more program statements that contribute to the computation of the first value written into the sensitive data field;

wherein determining the first set of program statements further comprises:

comparing a number of indirect references in the program with a threshold number, and adaptively determining the first set of program statements using dynamic program analysis if the number of indirect reference is equal to or greater than the threshold;

adaptively determining the first set of program statements using static program analysis if the number of indirect references is less than the threshold; and, analyzing the first set of program statements, and determining, based on the analysis of the first set of program statements, one or more data fields associated with the sensitive data field in the dataset.

4. A system for automatically identifying one or more data fields in a dataset, the system comprising:

a memory storing instructions and data, the data comprising a set of programs and a dataset having one or more data fields;

a processor to execute the instructions and to process the data, wherein the instructions comprise:

identifying a program in the set of programs, the program having one or more program statements for reading or writing a value in one or more fields in the dataset;

determining a first output program statement in the program, where the first program output statement is a program statement for writing a first value into a sensitive data field in the dataset;

determining a first set of program statements in the program, where the first set of program statements includes one or more program statements that contribute to the computation of the first value written into the sensitive data field;

wherein determining the first set of program statements further comprises:

determining a likelihood of generating one or more false positives;

adaptively determining the first set of program statements using dynamic analysis if the likelihood of generating one or more false positives is equal to or greater than a threshold;

adaptively determining the first set of program statements using static analysis if the likelihood of generating one or more false positives is less than the threshold; and analyzing the first set of program statements, and determining, based on the analysis of the first set of program statements, one or more data fields associated with the sensitive data field in the dataset.

\* \* \* \* \*

UNITED STATES PATENT AND TRADEMARK OFFICE
CERTIFICATE OF CORRECTION

PATENT NO.       : 8,661,423 B2                                      Page 1 of 1
APPLICATION NO.  : 12/771130
DATED            : February 25, 2014
INVENTOR(S)      : Agrawal et al.

It is certified that error appears in the above-identified patent and that said Letters Patent is hereby corrected as shown below:

In the Drawings:

In Fig. 5, Sheet 5 of 6, delete "  " and insert --  --, therefor.

In Fig. 5, Sheet 5 of 6, for Tag "555", in Line 1, delete "QUASI" and insert -- QUASI- --, therefor.

In the Specification:

In Column 2, Line 48, delete "DESCRIPTION" and insert -- BRIEF DESCRIPTION --, therefor.

In Column 7, Line 1, delete "factors," and insert -- factors --, therefor.

In Column 7, Line 64, delete "paths, that" and insert -- paths that --, therefor.

In Column 11, Line 40, delete "herein herein." and insert -- herein. --, therefor.

In the Claims:

In Column 14, Line 26, in Claim 4, delete "threshold; and" and insert -- threshold; and, --, therefor.

Signed and Sealed this
Twenty-fifth Day of November, 2014

Michelle K. Lee
*Deputy Director of the United States Patent and Trademark Office*